United States Patent [19]

Angermeier et al.

[11] Patent Number: 5,616,858
[45] Date of Patent: Apr. 1, 1997

[54] DIAGNOSTIC METHOD FOR RECOGNIZING COMBUSTION MISFIRING IN AN INTERNAL-COMBUSTION ENGINE

[75] Inventors: Anton Angermeier; Manfred Wier, both of Landshut, Germany

[73] Assignee: Siemens Aktiengesellschaft, Munich, Germany

[21] Appl. No.: 81,271

[22] PCT Filed: Dec. 2, 1991

[86] PCT No.: PCT/EP91/02277

§ 371 Date: Jun. 19, 1995

§ 102(e) Date: Jun. 19, 1995

[87] PCT Pub. No.: WO92/11522

PCT Pub. Date: Jul. 9, 1992

[30] Foreign Application Priority Data

Dec. 19, 1990 [DE] Germany .................. 90 12 4827.8

[51] Int. Cl.$^6$ ............................................. G01M 15/00
[52] U.S. Cl. ............................................. 73/117.3
[58] Field of Search ............................... 73/116, 117.3

[56] References Cited

U.S. PATENT DOCUMENTS 4,445,326   5/1984   Lyon .
4,700,563  10/1987   Iwata et al. ................ 73/118.1
5,214,958   6/1993   Inada et al. ................ 73/117.3
5,287,737   2/1994   Osawa et al. ............... 73/117.3
5,296,869   3/1994   Jonker et al. .............. 73/117.3

FOREIGN PATENT DOCUMENTS 61-72844  4/1986  Japan .
2-61368   3/1990  Japan .

OTHER PUBLICATIONS

"Kfz–Tester mit drahtloser MeBwertaufnahme", Elektronik, 38 (1989) 7 Jul., No. 14, pp. 78–80, 82.

Primary Examiner—Robert Raevis
Attorney, Agent, or Firm—Hill, Steadman & Simpson

[57]  ABSTRACT

In a diagnostic method for recognizing combustion misfiring in an internal-combustion engine, a map of characteristics, in which characteristic numbers dependent on load and on rotational speed are filed, is provided. One or more different diagnostic methods are selected by a diagnostic device depending on the respective characteristic number and allow as reliable information as possible of combustion misfiring for the respective load and rotational-speed range.

3 Claims, 1 Drawing Sheet

DIAGNOSTIC METHOD FOR
RECOGNIZING COMBUSTION MISFIRING
IN AN INTERNAL-COMBUSTION ENGINE

BACKGROUND OF THE INVENTION

1. Field of the Invention

The invention relates to a diagnostic method for recognizing combustion misfiring in an internal-combustion engine.

2. Description of the Related Art

The requirement to recognize misfiring under all the operating conditions of an internal-combustion engine, to make it possible to counteract increased emissions of harmful materials associated therewith or to perform protective functions with a catalytic converter, have increasingly becoming part of the corresponding regulations. Various methods have already become known for recognizing such combustion misfiring, such as, for example, the evaluation of erratic running or a lambda-probe signal or monitoring of the ignition current, etc.

It has been shown, however, that none of these methods can provide generally valid evidence of combustion misfiring. On the one hand, there is the problem that one method does not work with sufficient accuracy in all load and rotational-speed ranges, as, for example, in the consideration of erratic running. On the other hand, in some other methods, there is the problem that no reliable information about a proper combustion can be obtained, since only subfunctions necessary for the combustion method are diagnosed, as, for example, in ignition-current diagnosis.

SUMMARY OF THE INVENTION

In contrast to this, the object of the present invention is to provide a diagnostic method for detecting combustion misfiring, in such a way that information about a proper combustion in all the load and rotational-speed ranges of the internal-combustion engine can be obtained with greater reliability.

The solution according to the invention is provided by a diagnostic method for recognizing combustion misfiring in an internal-combustion engine, characterized in that a memory with a map of characteristics, in which characteristic numbers dependent on load and on rotational speed are filed, is provided, in that a selection device selects at least one diagnostic method from at least two diagnostic methods for detecting combustion misfiring depending on the read-out characteristic number, and in that the diagnostic device recognizes a combustion misfire when at least one of the diagnostic methods detects a combustion misfire. Advantageous developments of the invention are provided by the selection method selecting the diagnostic method from a group of diagnostic methods which evaluate method output quantities of the combustion method, such as erratic running, noise, vibrations, lambda-probe signal. A further improvement provides that the selection method selects the diagnostic method from a group of diagnostic methods which evaluate the method input quantities of the combustion method, such as ignition current or output signals from the output stages for the injection valves. The solution according to the invention proceeds from the consideration that diagnostic methods for detecting combustion misfiring can be divided into three groups.

The first group considers method output quantities, such as erratic running, noise, vibrations or the lambda-probe signal. The reaction of the internal-combustion engine to the combustion operation is therefore evaluated.

These methods are highly cost-effective since the sensors necessary for them are usually already present in engine control systems. The corresponding diagnosis therefore necessitates only additional software routines. However, the high dependence of many of these methods on load and on rotational speed is a problem, no reliable information being obtained in specific operating ranges, for example as a result of the influences of vibration and resonance.

The second group of diagnostic methods considers method input quantities, such as, for example, the ignition current or the output signals from the output stages for the injection valves. One of the preconditions for proper combustion is therefore respectively evaluated.

These methods are likewise highly cost-effective since only the corresponding electrical signals have to be evaluated. A problem of these methods is that in a negative diagnosis, admittedly a combustion misfire is reliably recognized, since no combustion can take place if the ignition current is absent or if output signals for the injection valves are absent. Nevertheless, in a positive diagnosis, no information is obtained, since, despite the presence of an ignition current or the presence of output signals, a combustion misfire can occur as a result of other influencing factors.

Finally, the third group considers the method itself, such as, for example, ionic current, pressure or light measurements in the combustion space. The progress of the combustion method is therefore considered directly here.

These methods are cost-intensive, since a corresponding sensor has to be installed in the combustion space in each case. The advantage of these methods is that they provide generally valid information for the combustion method.

In the solution according to the invention, a diagnostic method composed of the first two groups which can be executed in an especially cost-effective way is used. To avoid the disadvantage of the dependence on load and on rotational speed and the lack of general validity for a positive diagnosis, a diagnostic method is selected from a plurality of existing ones depending on load and on rotational speed.

For this purpose, characteristic numbers are filed in a map of characteristics depending on load and on rotational speed. A selection device selects the diagnostic method depending on the read-out characteristic number. All combinations are possible here. For example, in a particular operating range, a diagnostic method, such as that relating to erratic running, can be sufficient. In contrast, in another operating range, two or more diagnostic methods can be employed simultaneously.

Any combinations are possible also for recognizing a combustion misfire. A combustion misfire can be recognized, for example, when only a single diagnostic method or one diagnostic method of a plurality detect a combustion misfire. It is also possible to recognize a combustion misfire only when a plurality or all of the diagnostic methods used detect this case.

The selection of a specific combination is determined by test-bench or driving tests. By means of the characteristic numbers stored in the map of characteristics, different combinations can also be used in different load and rotational-speed ranges.

BRIEF DESCRIPTION OF THE DRAWINGS

The invention is explained in more detail by means of the figures, in which.

DETAILED DESCRIPTION OF THE PREFERRED EMBODIMENTS

The present diagnostic method makes use of a diagnostic device which is used within the framework of an engine control system with a microcomputer. The diagnostic device is part of the microcomputer system, essential functional parts being a memory with a map of characteristics stored in it and a further memory, in which corresponding diagnostic program routines are filed.

Figure 1:
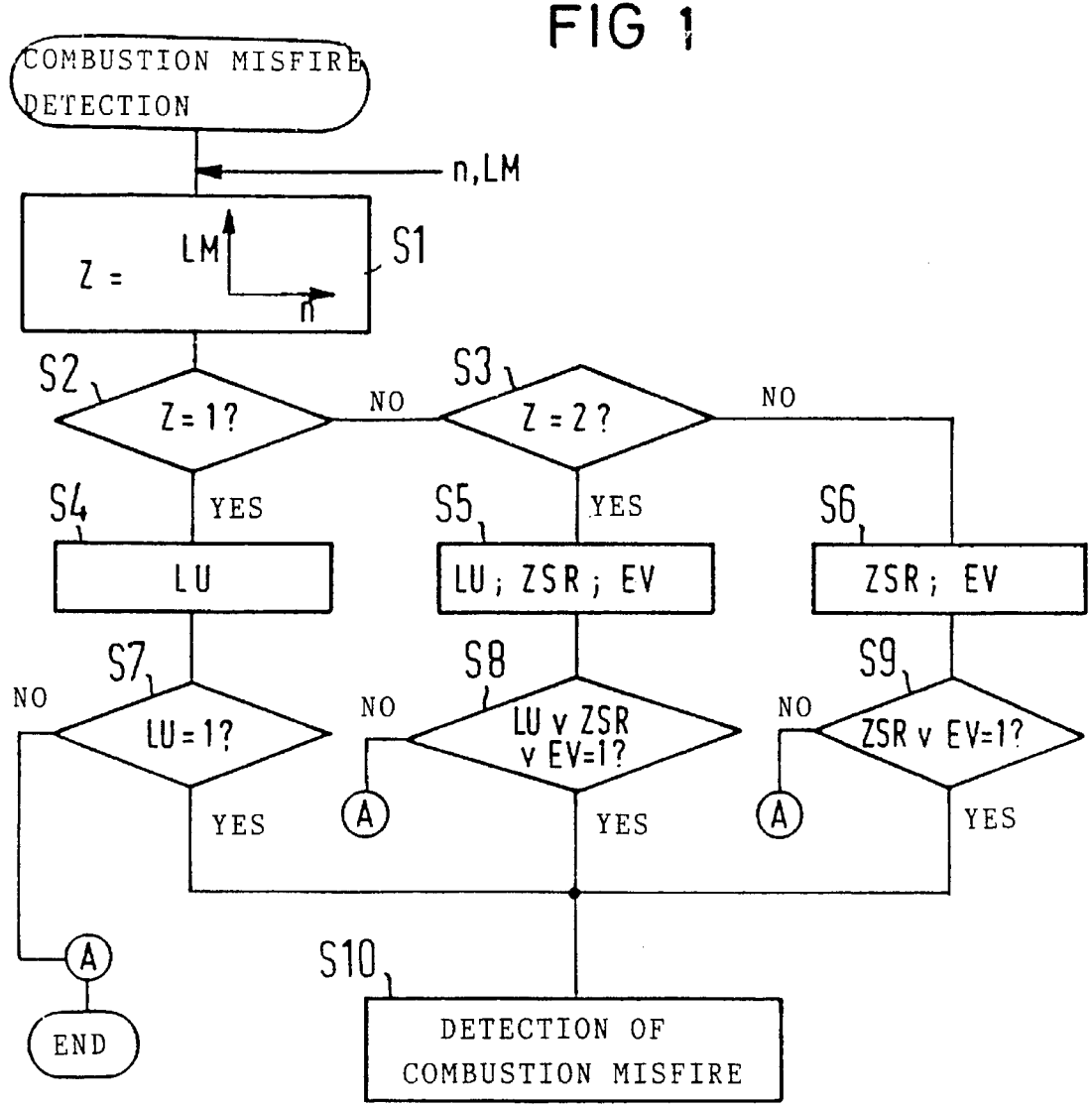
FIG. 1 shows a flow diagram to illustrate the operating mode of a diagnostic method according to the invention.

The flow diagram, shown in FIG. 1, of the recognition of a combustion misfire is called up cyclically by the engine control. The values for the rotational speed n and the intake air mass LM are obtained from other program routines of the engine control. Such program routines are, for example, those for the continuous injection-time and ignition-timing calculation which work respectively with the current load and rotational-speed values.

Figure 2:
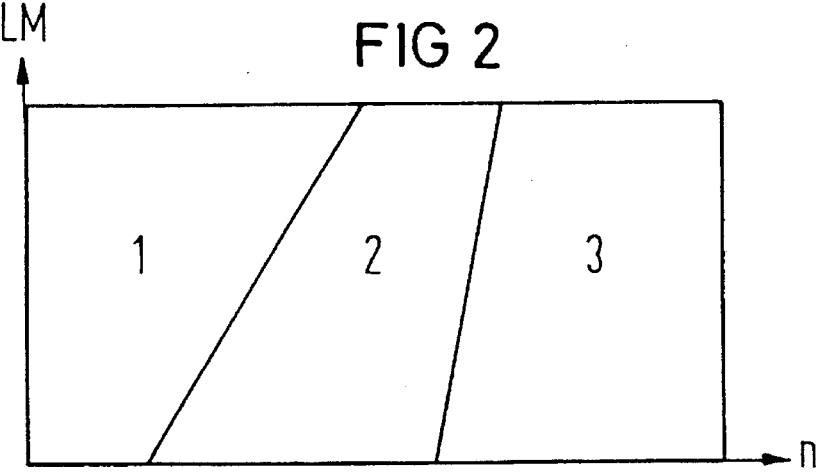
FIG. 2 shows a map of characteristics with characteristic numbers according to the invention.

In step S1, a characteristic number Z is determined depending on the rotational speed n and on the intake air mass LM. This characteristic number Z is filed in a map of characteristics which is shown in more detail in FIG. 2.

In the example, this contains three characteristic numbers Z which each represent a range of the map of characteristics. These ranges of the map of characteristics are fixed on the engine test bench and differ in that, in each range, a different combination of diagnostic methods for detecting combustion misfiring gives the best results in terms of evaluation reliability. The example shown applies to a specific 6-cylinder engine. In other engines, other combinations or also a larger or smaller number of ranges of the map of characteristics can be more suitable.

In steps S2 and S3, the various diagnostic methods for detecting combustion misfiring are then called up according to the characteristic number Z.

In the range of the map of characteristics with the characteristic number 1, this is a diagnostic method relating to erratic running. In this, the rotational speed for each cylinder is evaluated by means of two crank shaft positions and a combustion misfire is detected when the gradient of the rotational-speed trend falls below a limit value. Such a method is described in the applicant's European Patent Application 90123131.6.

Step S7 enquires whether a combustion misfire has been detected by means of the method. If so, there follows step S10, in which the diagnostic device recognizes a combustion misfire. If not, the program routine is terminated.

When the range of the map of characteristics with the characteristic number 2 is-recognized in step S3, a plurality of diagnostic methods are activated in step S5. These are the methods relating to erratic running, to the ignition current and to the output signals from the output stages for the injection valve. With regard to the diagnostic method relating to the ignition current, a check is made as to whether a corresponding ignition current is flowing in the primary or in the secondary circuit of the ignition. In the diagnostic method relating to the injection valves, the output signals from the output stages assigned to the injection valves are checked.

In step S8, a combustion misfire is detected when the diagnostic method relating to erratic running or to the ignition current or to the output signals from the output stages for the injection valves respond. The reason for this measure is that, in this range of the map of characteristics identified by the characteristic number 2, the diagnostic method relating to erratic running provides less reliable information particularly as a result of the influences of vibration. A combustion misfire is therefore additionally recognized in step S10 when the diagnostic method relating to the ignition current or to the output signals from the output stages for the injection valves have responded.

When the answer in step S3 is no, the characteristic number 3 must be present. Then, in step S6, the diagnostic methods relating to the ignition current and to the output signals from the output stages for the injection valves are activated. If there is an answer in the affirmative in step S9, a combustion misfire is recognized in step S10 when one of the two diagnostic methods responds. In this range of the map of characteristics, the diagnostic method relating to erratic running no longer provides virtually any useful information and is therefore omitted.

Although other modifications and changes may be suggested by those skilled in the art, it is the intention of the inventors to embody within the patent warranted hereon all changes and modifications as reasonably and properly come within the scope of their contribution to the art.

We claim:

1. A diagnostic method for recognizing combustion misfiring in an internal-combustion engine, comprising the steps of:

providing a memory with a map of characteristics, in which characteristic numbers dependent on load and on rotational speed are stored;

selecting at least one diagnostic method from at least two diagnostic methods for detecting combustion misfiring depending on a read out characteristic number from the memory using a selecting device;

recognizing a combustion misfire with a diagnostic device when the at least one of said at least two diagnostic methods detects a combustion misfire.

2. A diagnostic method as claimed in claim 1, wherein said step of selecting provides that the selecting device selects the diagnostic method from a group of diagnostic methods which evaluate at least one method output quantity of a combustion method selected from the group consisting of: erratic running, noise, vibrations, and lambda-probe signal.

3. A diagnostic method as claimed in claim 1, wherein said step of selecting provides that the selecting device selects the diagnostic method from a group of diagnostic methods which evaluate at least one method input quantity of a combustion method selected from the group consisting of: ignition current and output signals from the output stages for the injection valves.

* * * * *